United States Patent
Enderich et al.

(10) Patent No.: US 9,873,073 B2
(45) Date of Patent: Jan. 23, 2018

(54) AIR FILTER ELEMENT

(75) Inventors: Andreas Enderich, Esslingen (DE);
Alexander Jerger, Pforzheim (DE);
Matthias Traub, Boeblingen (DE);
Hendrik Von Merkatz, Remseck (DE);
Hans Waibel, Remseck/Aldingen (DE)

(73) Assignee: Mahle International GmbH (DE)

( * ) Notice: Subject to any disclaimer, the term of this patent is extended or adjusted under 35 U.S.C. 154(b) by 1101 days.

(21) Appl. No.: 13/997,193

(22) PCT Filed: Dec. 19, 2011

(86) PCT No.: PCT/EP2011/073155
§ 371 (c)(1),
(2), (4) Date: Sep. 16, 2013

(87) PCT Pub. No.: WO2012/084753
PCT Pub. Date: Jun. 28, 2012

(65) Prior Publication Data
US 2014/0000228 A1 Jan. 2, 2014

(30) Foreign Application Priority Data

Dec. 23, 2010 (DE) .......... 10 2010 064 030

(51) Int. Cl.
*B01D 46/00* (2006.01)
*B01D 46/10* (2006.01)
*B01D 46/52* (2006.01)

(52) U.S. Cl.
CPC ....... *B01D 46/002* (2013.01); *B01D 46/0021* (2013.01); *B01D 46/103* (2013.01); *B01D 46/521* (2013.01); *B01D 2275/206* (2013.01)

(58) Field of Classification Search
CPC ...... B01D 46/02; B01D 46/21; B01D 46/103; B01D 46/521; B01D 2275/206;
(Continued)

(56) References Cited

U.S. PATENT DOCUMENTS 4,200,444 A     4/1980  Witchell
5,412,837 A  *  5/1995  Worwag .................. A47L 5/00
                                                    15/327.6
(Continued)

FOREIGN PATENT DOCUMENTS

CN        101678264 A       3/2010
DE     102007024287 A1     11/2008
(Continued)

OTHER PUBLICATIONS

English Abstract for CN101678264A.
(Continued)

*Primary Examiner* — Heidi Kelley
*Assistant Examiner* — Karla Hawkins
(74) *Attorney, Agent, or Firm* — Fishman Stewart PLLC

(57) ABSTRACT

An air filter element for an air filter may include a first end plate and a second end plate spaced apart from each other in an axial direction and configured to bound the filter element in the axial direction. The first filter body may be arranged axially between the first and second end plates. A second filter body may be arranged axially between the first and second end plates. An intermediate plate may be arranged axially between the first and second filter bodies and have an intermediate plate area enclosed by an intermediate outer contour and a first end plate area enclosed by a first outer contour.

19 Claims, 5 Drawing Sheets

(58) Field of Classification Search
CPC ......... B01D 46/19; B01D 46/23–46/24; B01D 46/206; B01D 46/2411; B01D 46/2275
See application file for complete search history.

(56) References Cited

U.S. PATENT DOCUMENTS

| | | | | |
|---|---|---|---|---|
| 6,692,639 | B1 * | 2/2004 | Spearman | B01D 29/117 210/323.2 |
| 2009/0313960 | A1 | 12/2009 | Felber et al. | |
| 2010/0154369 | A1 * | 6/2010 | Berisha | B01D 46/103 55/493 |

FOREIGN PATENT DOCUMENTS

| | | |
|---|---|---|
| DE | 102008028834 A1 | 12/2009 |
| JP | 04-134175 B2 | 5/1992 |
| JP | 04-175459 B2 | 6/1992 |

OTHER PUBLICATIONS

Chinese Office Action for Patent Application CN 201180060902.9 with attached Letter re: Translation and Comments.
English abstract for JP 4-134175.
English abstract JP4-175459.

* cited by examiner

AIR FILTER ELEMENT

CROSS REFERENCE TO RELATED APPLICATIONS

This application claims priority to German Patent application 10 2010 064 030.1 filed Dec. 23, 2010 and International Patent Application PCT/EP2011/073155 filed on Dec. 19, 2011, all of which are hereby incorporated by reference in their entirety.

TECHNICAL FIELD

The present invention relates to an air filter element for an air filter of a motor vehicle, in particular a commercial vehicle, having the features of the preamble of claim 1. The invention also relates to an air filter which is equipped with such an air filter element, for an internal combustion engine, in particular of a motor vehicle.

BACKGROUND

DE 10 2008 028 834 A1 discloses an air filter element which has a filter body consisting of a filter material and a first end plate and a second end plate, which are spaced apart from each other in the axial direction and bound the filter element in the axial direction. The filter body is thus arranged axially between the two end plates, which consist of an airtight plate material such as plastic. In the known air filter element, the two end plates lie in planes running in an inclined manner with respect to each other. The air filter element is thereby adapted to a predefined installation situation.

The accommodation of air filters in vehicles is often problematic because there is regularly only a small amount of installation space available. In order to be able to utilise the available installation space better, it is in principle possible to design a corresponding filter housing geometrically, taking into account the available installation space situation. The associated filter element must then be designed in a complementary manner to the housing. However, in the case of series products, in particular large-scale series products, this is problematic, as complex geometries in large-scale series parts result in excessively high piece prices. For this reason simple geometries are often preferred for large-scale series parts.

JP 04-175459 A and JP 04-134175 A disclose further air filters for motorcycles, the filter element of which has two filter bodies, which are of different sizes and are each closed axially with two identically sized end plates. The end plates, which face each other, of the two filter bodies are arranged on each other in an airtight manner. In JP 04-175459 A, a first air inlet tube opens into the interior of the first filter body, while a separate second inlet tube opens into the interior of the second filter body, wherein the two interiors are fluid-connected to each other by means of the two end plates which bear against each other. In contrast to this, in JP 04-134175 A, a common inlet tube is provided, which opens into the two interiors of the two filter bodies, which are fluid-connected to each other.

DE 10 2007 024 287 A1 discloses a filter element having only one filter body, which is arranged between two end plates. In this case the filter body has a U-shaped cross section, one open side of the filter body being closed with a closure plate, which is connected to both end plates.

WO 02/40133 A1 discloses a filter element having two filter bodies, two end plates and a common intermediate plate which is assigned to both filter bodies. In the known filter element, the two filter bodies are configured as identical parts, and the three plates, that is, the two end plates and the intermediate plate, are also configured as identical parts, at least the two end plates and the intermediate plate are of the same size.

SUMMARY

The present invention is concerned with the problem of specifying an improved embodiment for an air filter element of the type mentioned at the beginning or for an associated air filter, with which improved utilisation of the available installation space is possible, while at the same time comparatively low production costs can be maintained.

This problem is solved according to the invention by the subject matter of the independent claims. Advantageous embodiments form the subject matter of the dependent claims.

The invention is based on the general concept of arranging at least two filter bodies, namely a first filter body and a second filter body, between the two end plates. Moreover, it is proposed that a common intermediate plate be arranged axially between two adjacent filter bodies. In other words, for each two axially adjacent filter bodies, only a single intermediate plate is provided, which is assigned to both filter bodies. In comparison with a conventional design, in which each filter body is assigned two end plates, in this case one plate is omitted, while the airtight arrangement of the end plates facing each other is omitted as well as sealing measures and/or connection and/or fastening measures. The intermediate plate preferably consists of an airtight plate material such as plastic, like the two end plates. The two end plates are identical or differ in terms of their geometric shape, in particular by a different outer contour and/or size. The intermediate plate is designed, in particular in terms of its shape and size, in such a manner that the projected areas of the two end plates can be reproduced thereon.

According to the invention, an outer contour of the intermediate plate encloses an intermediate plate area which is greater than an end plate area enclosed by the outer contour of one end plate and/or which is greater than an end plate area enclosed by the outer contour of the other end plate. The intermediate plate area is thus at least larger than one of the end plate areas. The other end plate area can then be either the same size as the intermediate plate area or likewise smaller than the intermediate plate area.

For clarification, it should be pointed out that the said areas should be understood independently of whether the respective plate has an axial opening, that is, designed as an open plate, or whether it is designed as a closed plate which does not have an axial opening.

Expediently, the individual plates lie in associated plate planes, which run parallel to each other, preferably in each case perpendicularly to the axially oriented longitudinal centre axis of the filter element.

The projected areas of the end plates can preferably have an overlap region on the intermediate plate, in which a passage for the fluid cleaned or to be cleaned from one filter body into the other filter body can be provided. In contrast to a conventional air filter element, the air filter element according to the invention thus does not have only one single filter body but at least two filter bodies, which are each bounded axially by two plates, the central plate, namely the intermediate plate, being used by both filter bodies together. The filter element can be stabilised by the intermediate plate. Moreover, the intermediate plate forms a geometrically defined partition between the two filter bodies, which acts like an interface, as a result of which it is possible for example to design the two filter bodies differently in terms of their shape, size, filtration properties or other properties. In this manner even complex geometries can be realised for the filter element to be able to utilise the available installation space better.

In principle, the two end plates can be designed differently. E.g. the two end plates have different geometries and/or different end plate areas and/or different outer contours. They can in principle also be produced from different materials. Alternatively, however, an embodiment is also possible in which the two end plates are identical, that is, are equal, and are correspondingly designed as identical parts. The production costs of the filter element can be considerably reduced thereby.

Additionally or alternatively, the two filter bodies can be designed differently. E.g. the two filter bodies have different geometries and/or different cross-sectional areas and/or different outer contours. They can in principle also be produced with different filter materials. Alternatively, however, an embodiment is also possible in which the two filter bodies are identical, that is, are equal, and are correspondingly designed as identical parts. The production costs of the filter element can be considerably reduced thereby.

In particular, an embodiment can also be realised which has two identical filter bodies and two identical end plates. However, with regard to the improved utilisation of the available installation space, an embodiment is preferred in which the two end plates and the two filter bodies differ from each other, in particular in geometrical terms.

According to another advantageous embodiment, it can be provided for the filter element to consist of only five constituent parts, namely of the two end plates, the two filter bodies and the common intermediate plate. This produces a particularly inexpensive construction for the filter element.

According to an advantageous embodiment, the first end plate can seal the first filter body on a first axial side, while the intermediate plate seals the first filter body on a second axial side. At the same time, the same intermediate plate seals the second filter body on a first axial side, while the second end plate seals the second filter body on a second axial side. Whereas the end plates seal only a single axial side each, namely the outer axial sides of the two filter bodies, which face away from each other, the intermediate plate seals the two inner axial sides of the two filter bodies, which face each other, at the same time. The intermediate plate forms a type of interface which makes it possible to integrate the two filter bodies, which can in principle be shaped differently and/or dimensioned differently, to form a common filter element.

The two end plates can preferably be closed, in particular over the whole area, whereas the intermediate plate is open and correspondingly has at least one opening through which a first interior, which is bounded circumferentially by the first filter body, is fluid-connected to a second interior, which is bounded circumferentially by the second filter body. The two interiors of the two filter bodies can form a common inside of the filter element owing to the open intermediate disc.

According to another embodiment, the first filter body can be U-shaped in axial section, wherein an open side of the U-shaped first filter body is sealed with a closure plate, this closure plate having a connection opening by means of which a fluid connection to the first interior or to the inside of the filter element is possible. It is thereby possible to provide the filter element or a filter housing which fits it with a lateral connection for untreated air or clean air, which is advantageous for certain installation configurations. An embodiment in which the connection opening is positioned between the first end plate and the intermediate plate is particularly expedient.

Furthermore, an embodiment in which the closure plate extends substantially parallel to the axial direction, at least in the region of the first filter body, is advantageous. This produces simple outer contours, which makes it easier to insert the filter element into the filter housing.

Furthermore, it can be provided for the closure plate to extend axially only in the region of the first filter body, that is, not to reach as far as the second filter body. This can be advantageous in particular if the second filter body has a closed design or structure in the circumferential direction.

Alternatively, it is possible in another embodiment for the closure plate to extend axially over both filter bodies. For example, such an embodiment can be advantageous if the second filter body is also U-shaped in axial section, the open side of the U-shaped second filter body being sealed with the aid of the closure plate. A single, common closure plate can thus be used to seal both laterally open filter bodies.

In another embodiment, the second filter body can in axial section surround or bound an associated second interior in a closed manner in the circumferential direction, so the second filter body does not have an open side. This second filter body is preferably provided with a round cross section, in particular with a cylindrical or annular cross section, in particular with an oval or elliptical or circular cross section.

Different embodiments for the filter element can thus be realised. For example, a filter element is conceivable which has a U-shaped first filter body and an annular second filter body. Alternatively, a filter element in which both filter bodies are U-shaped can also be produced. In principle, an embodiment in which both filter bodies are annular is also conceivable.

An embodiment in which the two filter bodies are geometrically different is particularly advantageous. As mentioned, different installation situations can thereby be used optimally to accommodate the filter element.

In another embodiment, the end plates and the intermediate plate can run parallel to each other, that is, in parallel planes to each other. This makes the filter bodies particularly simple to produce. For example, a web-shaped filter material can be used to produce the filter bodies, which is folded in a zigzag shape, the folded filter material then being arranged around the respective interior according to the geometry of the filter body. The pleated filter material can also be rolled to prevent adjacent folds from lying flat against each other.

Alternatively, an embodiment in which at least two of the plates lie in planes inclined to each other is also conceivable.

The present invention also relates to an air filter having a filter housing, the filter housing having an air inlet and an air outlet and also enclosing a receiving space. The air filter further comprises a filter element according to the invention, which is inserted into the receiving space. In the receiving space, the filter element separates an untreated side which is fluid-connected to the air inlet from a clean side which is fluid-connected to the air outlet.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures.

DETAILED DESCRIPTION

Figure 1:
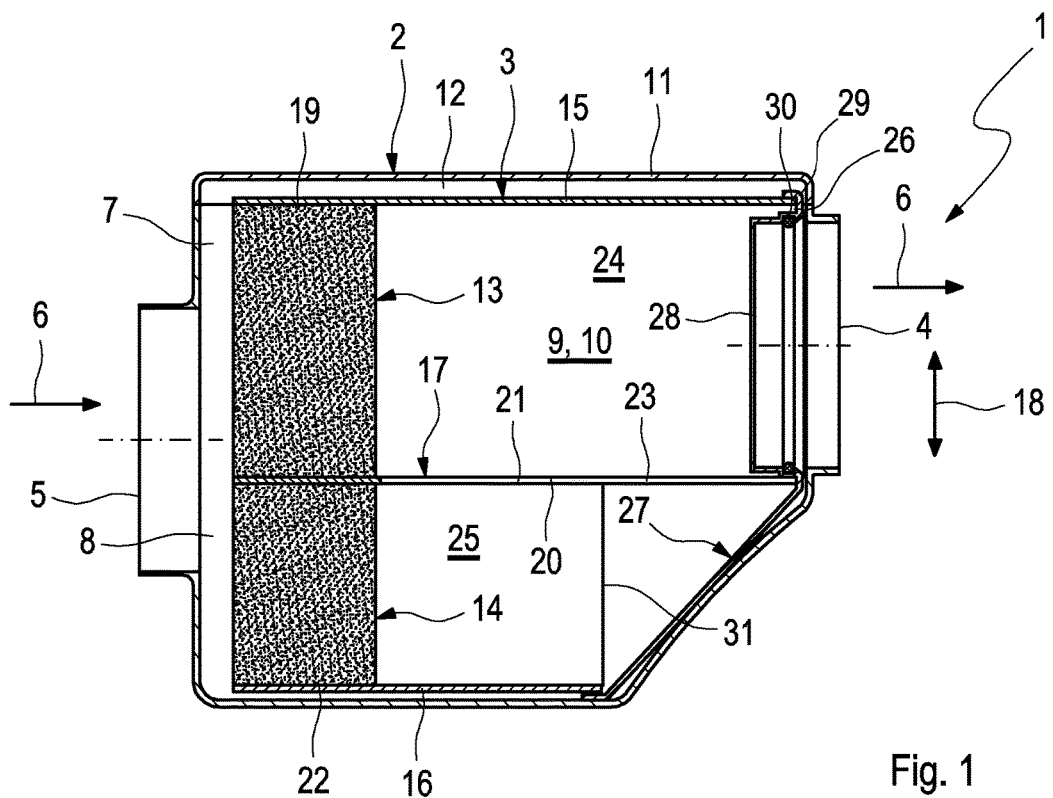
FIG. 1 schematically shows a sectional view of an air filter having a filter housing and a filter element arranged therein, FIG. 2 schematically shows an isometric sectional view of the air filter with the filter housing and the filter element, FIG. 3 schematically shows an isometric view of the air filter with the cover removed from the filter housing, FIG. 4 schematically shows an isometric view of the filter element, FIG. 5 schematically shows an exploded isometric view of the filter element of FIG. 4, FIG. 6 schematically shows an isometric view of the filter element as in FIG. 4, but in a different embodiment, FIG. 7 schematically shows an exploded isometric view of the filter element of FIG. 6, FIG. 8 schematically shows an isometric view of a schematically shown filter element in another embodiment.
Figure 2:
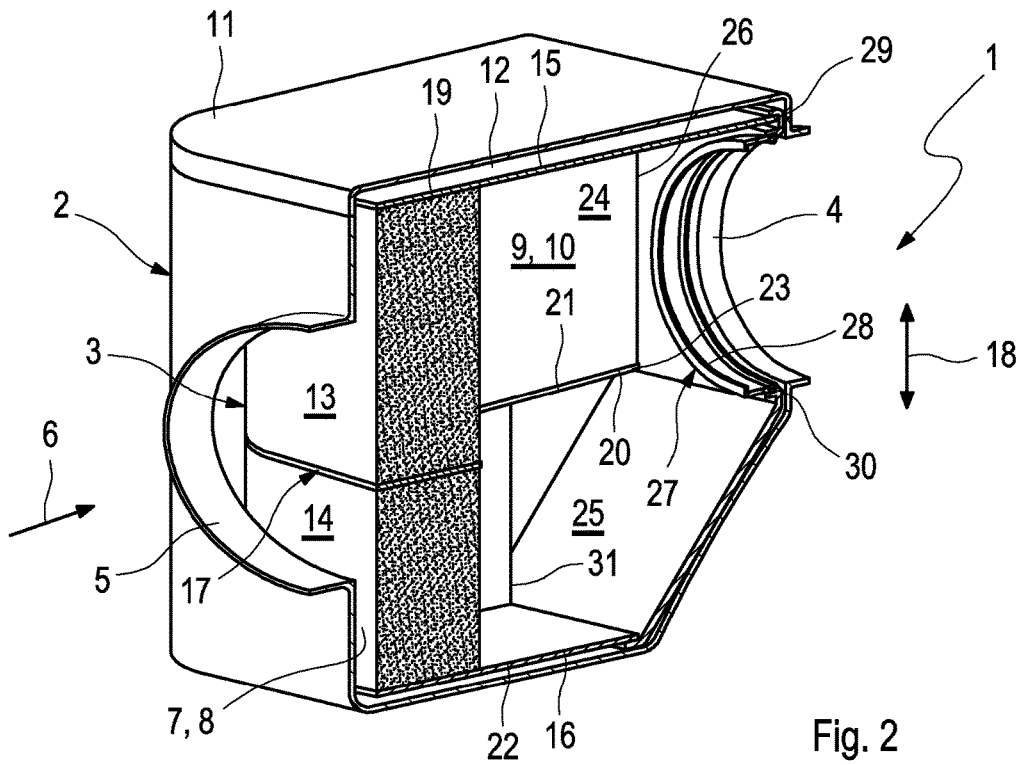
Figure 3:
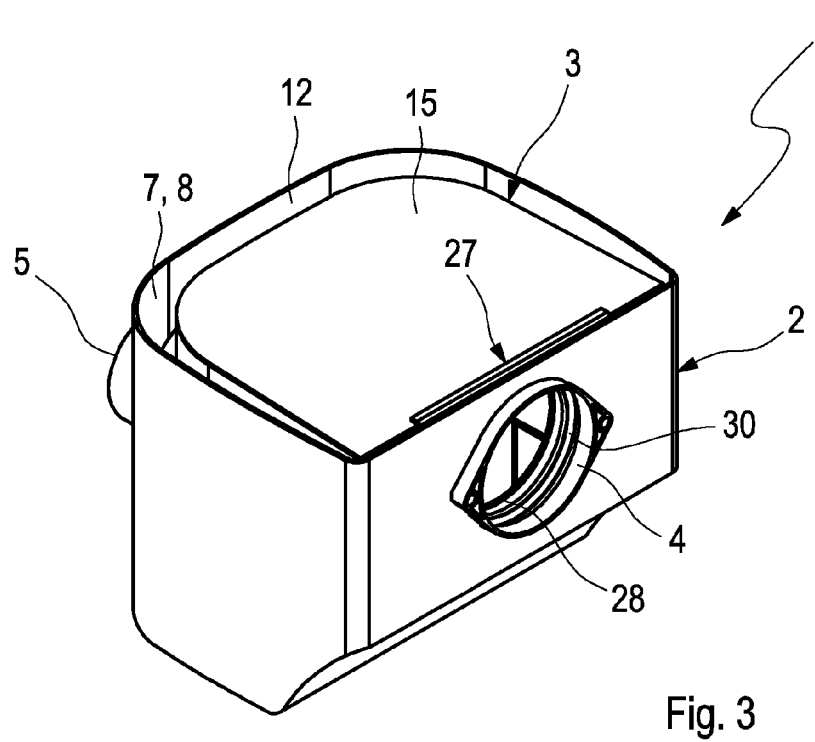
Figure 4:
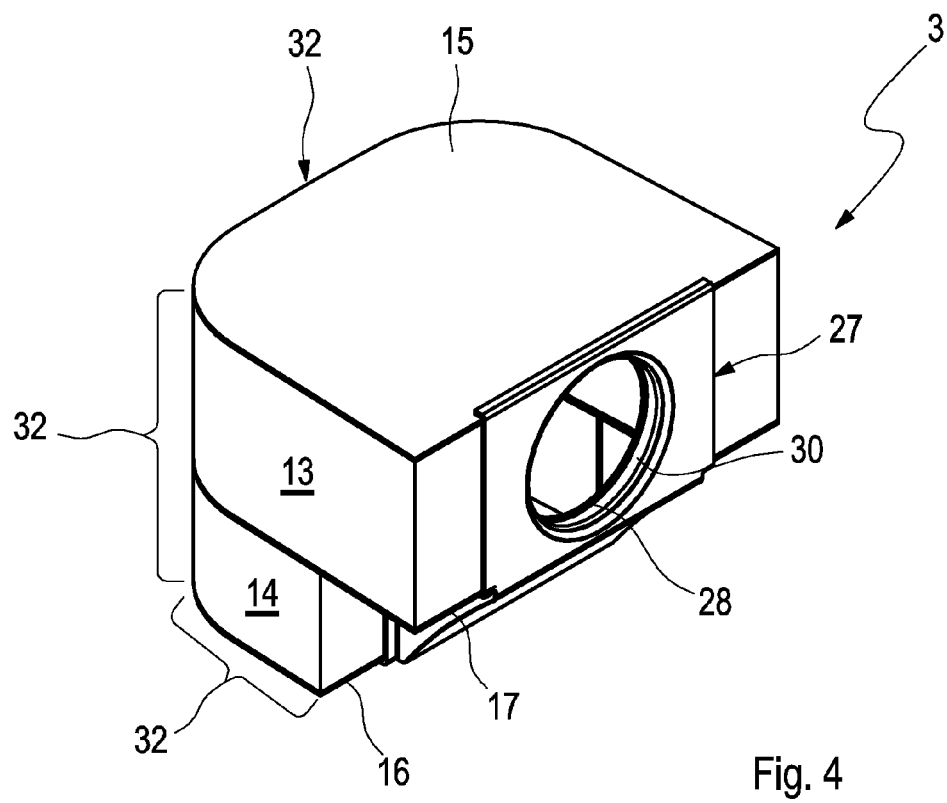
Figure 5:
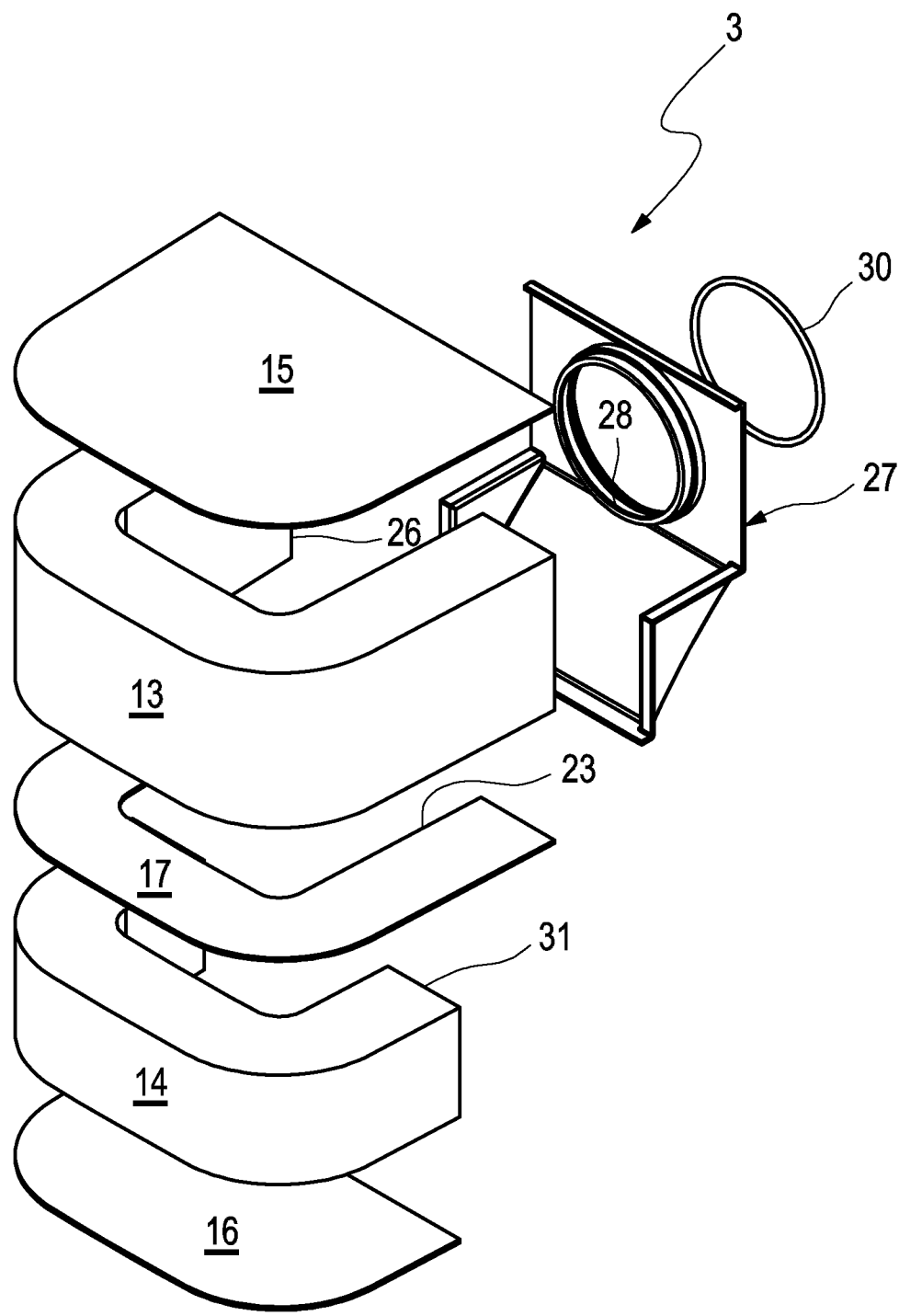

According to FIGS. 1 to 3, an air filter 1 comprises a filter housing 2 and an air filter element 3 or filter element 3. The air filter 1 is used to filter intake air of an internal combustion engine, which can in particular be arranged in a vehicle.

The filter housing 2 has two openings 4 and 5, of which one acts as an air inlet, whereas the other acts as an air outlet. In FIG. 1, an air flow 6 is indicated purely by way of example by arrows. With this flow direction, the opening labelled 5 forms the air inlet 5, while the opening labelled 4 forms the air outlet 4. In principle, the reverse flow direction is also conceivable, so then the opening labelled 4 forms the air inlet 4, while the opening labelled 5 forms the air outlet 5.

The filter housing 2 encloses a receiving space 7 for receiving the filter element 3. In this receiving space 7, the filter element 3 separates an untreated side 8, which is fluid-connected to the air inlet 5, from a clean side 9, which is fluid-connected to the air outlet 4. In the example shown, flow passes through the filter element 3 from the outside inwards, so an inside 10 of the filter element 3 forms the clean side 9. If the flow direction is reversed, the inside 10 of the filter element 3 then correspondingly forms the untreated side.

In the example, the filter housing 2 also has a cover 11, with which an access opening 12, through which the filter element 3 can be inserted into or taken out of the receiving space 7, can be closed. In FIGS. 1 and 2, the cover 11 closes the access opening 12. In FIG. 3 the cover 11 is removed, as a result of which access to the filter element 3 is possible.

According to FIGS. 1 to 8, the respective air filter element 3 has a first filter body 13 consisting of a filter material and a second filter body 14 consisting of a filter material. The two filter bodies 13, 14 expediently consist of the same filter material. The filter element 3 also comprises a first end plate 15, a second end plate 16 and a single or common intermediate plate 17. In the figures, the two end plates 15, 16 are spaced apart from each other by an axial direction 18 which is indicated by a double arrow. The axial direction 18 extends parallel to faces or folds of the web-shaped, folded filter material. Alternatively, the axial direction 18 in the exemplary embodiments shown, in which the plates 15, 16, 17 run parallel to each other, can also be defined in that it extends perpendicularly to a plane to which the plates 15, 16, 17 run parallel. As can be seen, the two end plates 15, 16 have different geometrical designs, in particular in terms of dimensions and circumferential contour, in the embodiments shown here. Alternatively, an embodiment in which the two end plates 15, 16 are identical is also possible.

Further, the two end plates 15, 16 bound the filter element 3 in the axial direction 18. Both filter bodies 13, 14 are thus arranged axially between the two end plates 15, 16.

The intermediate plate 17 is arranged axially between the two end plates 15, 16 and moreover axially between the two filter bodies 13, 14. In detail, a construction for the filter element 3 is thus produced in which the first filter body 13 adjoins the first end plate 15 in the axial direction 18, the intermediate plate 17 adjoins the first filter body 13, the second filter body 14 adjoins the intermediate plate 17 and the second end plate 16 adjoins the second filter body 14.

The first end plate 15 closes the first filter body 13 in an airtight manner on a first axial side 19. The intermediate plate 17 closes the first filter body 13 in an airtight manner on a second axial side 20. The intermediate plate 17 also closes the second filter body 14 in an airtight manner on a first axial side 21. The second end plate 16 closes the second filter body 14 in an airtight manner on a second axial side 22.

It can be seen that the two end plates 15, 16 are closed over their entire area, so no air can enter or exit the inside 10 of the filter element 3 axially through the end plates 15, 16. The intermediate plate 17 is centrally open. To this end, it has at least one opening 23. The first filter body 13 bounds a first interior 24 in the circumferential direction, while the second filter body 14 bounds a second interior 25 in the circumferential direction. The circumferential direction relates to the axial direction 18. The two interiors 24, 25 are fluid-connected to each other through the at least one opening 23 in the intermediate plate 17. The two interiors 24, 25 can thereby form the inside 10 of the filter element 3 together.

In the preferred embodiments shown here, the first filter body 13 is U-shaped in axial section, that is, in a sectional plane running perpendicularly to the axial direction 18. As a result, the first filter body 13 has an open side 26 transversely to the axial direction 18. This open side 26 of the first filter body 13 is closed in an airtight manner with a closure plate 27. The closure plate 27 has a connection opening 28, through which a fluid connection to the inside 10 of the filter element 3 is possible. The filter element 3 is inserted into the filter housing 2 in such a manner that the connection opening 28 is fluid-connected to the housing opening 4 which forms the outlet 4 in the example. In particular, an annular sealing contour 29 can be formed on the closure plate 27 on an outer side facing away from the inside 10 in order to separate the inside 10 of the filter element 3 from the region of the receiving space 7 situated outside the filter element 3 in a leakproof manner in the region of the housing opening 4. Additionally or alternatively, the closure plate 27 can have a sealing ring 30 in the region of the connection opening 28, as a result of which it is possible to insert a connection tube (not shown) into the connection opening 28 through the housing opening 4 in such a manner that the connection tube is sealed off at the connection opening 28 directly by means of the sealing ring 30, so the risk of leaks is reduced.

In the example, the connection opening 28 is arranged on the closure plate 27 in such a manner that it is situated completely axially between the first end plate 15 and the intermediate plate 17. The connection opening 28 allows a lateral connection, that is, oriented transversely to the axial direction 18, for discharging the clean air or, if the flow direction is reversed, for supplying the untreated air. To this end, the closure plate 27 extends substantially parallel to the axial direction 18, at least in the region of the first filter body 13.

In the embodiment shown in FIGS. 1 to 5, the closure plate 27 extends in the axial direction 18 over both filter bodies 13, 14. In this embodiment, the second filter body 14 is also U-shaped in axial section, so the second filter body 14 also has an open side 31 transversely to the axial direction 18. The two open sides 26, 31 of the two filter bodies 13, 14 are expediently oriented the same. The open side 31 of the second filter body 14 can thus also be closed in an airtight manner with the aid of the closure plate 27.

Figure 6:
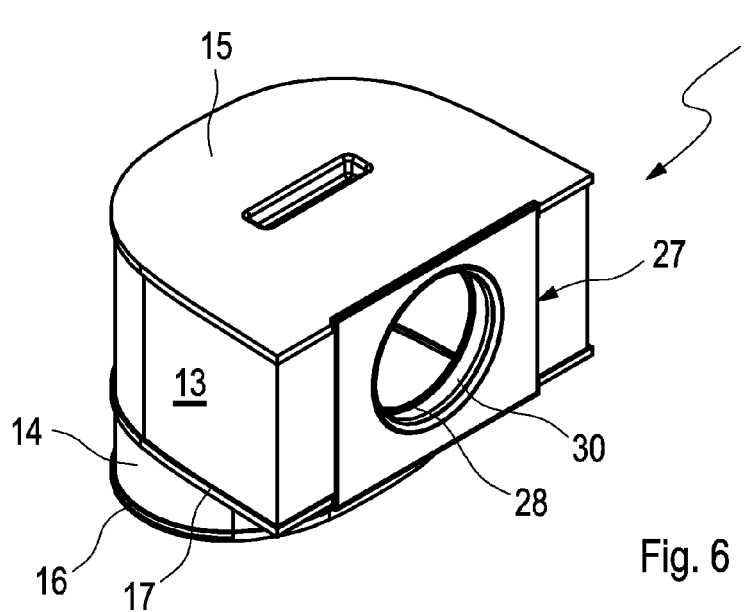
Figure 7:
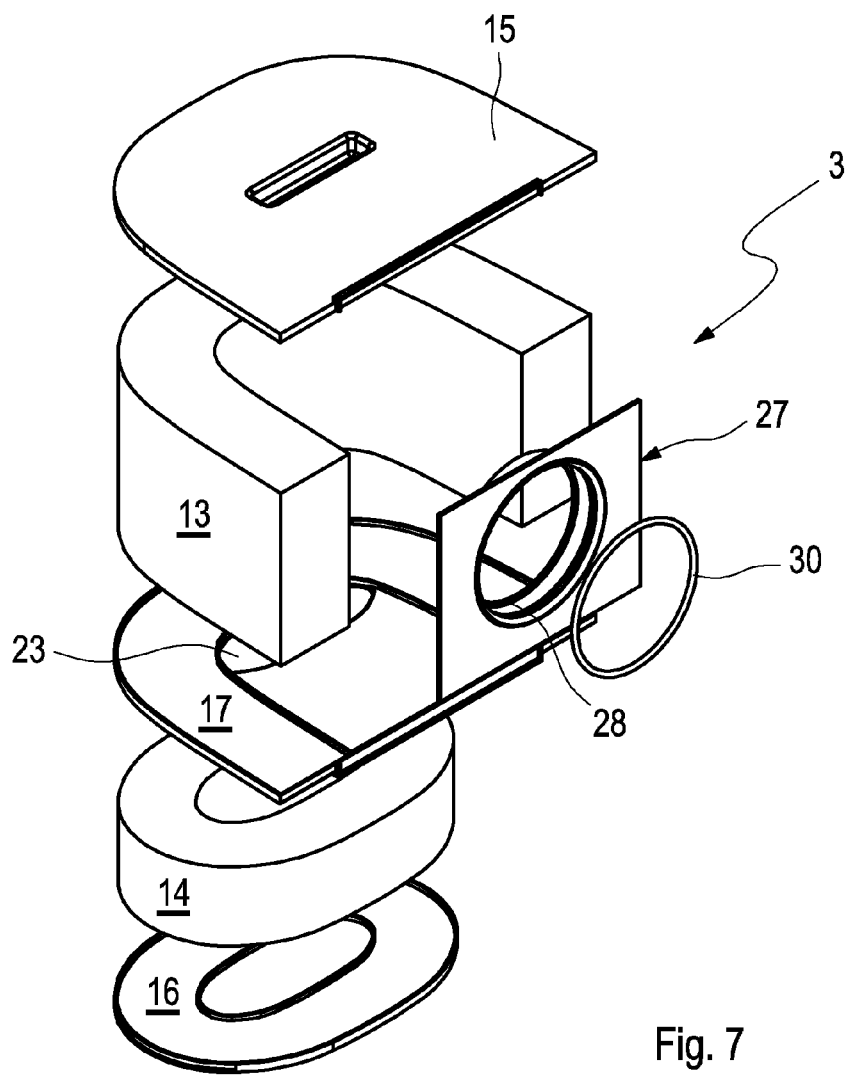

In contrast to this, FIGS. 6 and 7 show an embodiment in which the closure plate 27 extends in the axial direction 18 only in the region of the first filter body 13. In this embodiment, the second filter body 14 is designed in such a manner that it surrounds the second interior 25 in a closed manner in the circumferential direction, so the second filter body 14 does not have an open side in this embodiment, in contrast to the first filter body 13. For example, the second filter body 14 can have an oval cross section in axial section. In principle, however, other round cross sections are also possible, such as elliptical cross sections and circular cross sections. The second filter body 14 is in particular cylindrical or annular.

In the embodiments shown here, the two filter bodies 13, 14 are geometrically different. Although in the embodiments of FIGS. 1 to 5 both filter bodies 13, 14 are provided with a U-shaped cross section, the two filter bodies 13, 14 have different sizes. For example, the first filter body 13 has a greater height in the axial direction 18 than the second filter body 14. The first filter body 13 is also longer transversely to the axial direction 18 than the second filter body 14. In the embodiment shown in FIGS. 6 and 7, different cross-sectional geometries are already present. Whereas the first filter body 13 has a U-shaped cross section, the second filter body 14 has an annular or cylindrical cross section. The two filter bodies 13, 14 also have different heights in relation to the axial direction 18.

In the embodiments shown here, the end plates 15, 16 and the intermediate plate 17 are flat and in particular arranged parallel to each other. In principle, however, other embodiments are also conceivable, in which the flat plates 15, 16, 17 can run in an inclined manner with respect to each other and/or in which at least one of the plates 15, 16, 17 can be uneven, in particular curved. In the embodiments shown, the intermediate plate 17 has an outer contour which corresponds to the outer contour of the first end plate 15. The projected area of the first end plate 15 thus corresponds to the contour of the intermediate plate 17. The projected area of the second end plate 16 can be completely reproduced on the intermediate plate 17, so a projected overlap region of the first and second end plates 15, 16 is formed on the intermediate plate 17. Furthermore, it can be seen in the described embodiments that the filter bodies 13, 14 have regions 32 which align with each other, at least in some regions. This is illustrated for example in FIG. 4. These aligning part-regions 32 are arranged in the region of the rounded portions or in the region of the U-bend and the U-sides. A uniform flow is thus produced in these part-regions 32 by the flush alignment.

Figure 8:
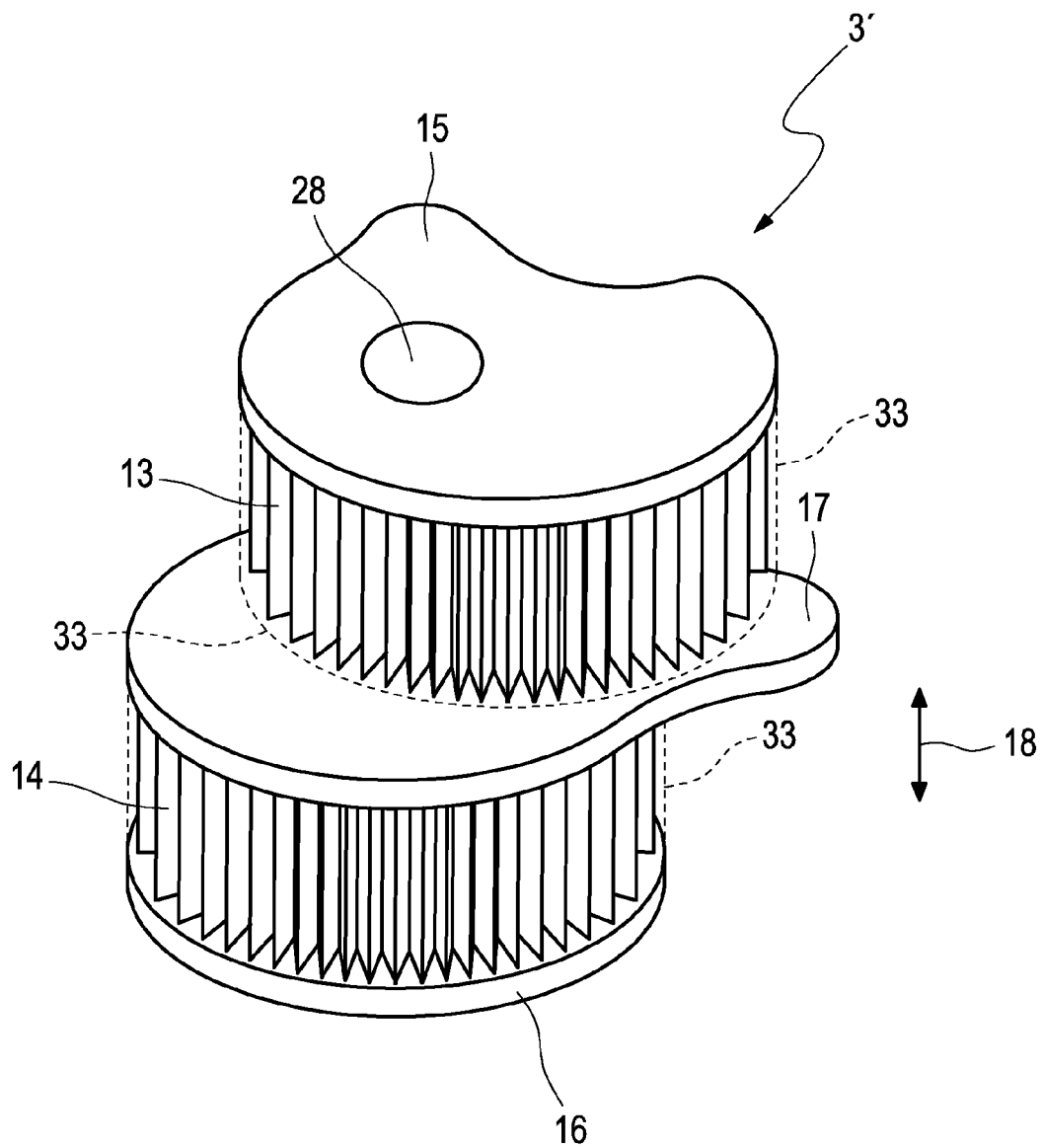

FIG. 8 shows an isometric diagram of a further filter element 3. The end plates 15 and 16 have any desired flat outer geometry, which can of course also be round, oval, polygonal, kidney-shaped or U-shaped. In this case the end plates 15, 16 differ from each other both in terms of size and outer contour. Alternatively, it can also be provided for the two end plates 15, 16 to be the same. The filter bodies 13 and 14 arranged on the respective end plates 15, 16 are arranged in a stepped or offset manner with respect to each other and do not have any outer regions which align with each other. The interiors 24, 25 however have an overlap region with which the interiors 24, can be connected to each other through an opening 23 (not shown). With other configurations, the filter bodies 13, 14 or the end plates 15, 16 can be aligned with respect to each other on a line running flush in the axial direction 18. The filter bodies 13, 14 and the end plates 15, 16 can however leave this alignment immediately or retain it in a defined part-region 32. The intermediate plate 17 is designed in such a manner that both end plates 15, 16 can be reproduced thereon with their respective projected areas 33. In this case the contour of the intermediate plate 17 differs both from the geometry of the first end plate 15 and from the geometry of the second end plate 16. In the embodiment shown, the first end plate 15 has the connection opening 28. The fluid to be cleaned can thus enter and exit the filter element 3. In alternative configurations, the connection opening 28 can also be arranged in a laterally arranged closure plate 27 according to the previous diagrams. The opening 23 (not shown) for connecting the two interiors 24, 25 is arranged in the overlap region of the two projected areas 33. The filter element 3 can be adapted to any installation spaces owing to this stepped arrangement of the filter bodies 13, 14.

Of course, the embodiments of the filter element 3 described above with reference to FIGS. 1 to 8 can also be realised with more than two filter bodies 13, 14. In this case, correspondingly more intermediate plates 17 are then used, which can be identical or different in their geometrical design and which are each assigned to two adjacent filter bodies 13, 14.

The invention claimed is:

1. An air filter element for an air filter, comprising:
   a first filter body comprising a filter material,
   a first end plate and a second end plate spaced apart from each other in an axial direction and configured to bound the filter element in the axial direction,
   wherein the first filter body is arranged axially between the first and second end plates,
   a second filter body arranged axially between the first and second end plates,
   an intermediate plate arranged axially between the first and second filter bodies,
   wherein the intermediate plate has an intermediate plate area greater than at least one of a first end plate area of the first end plate and a second end plate area of the second end plate;
   wherein the first and second end plates are closed and the intermediate plate defines at least one intermediate opening extending through a first interior bounded by the first filter body to a second interior bounded by the second filter body;
   wherein the first filter body is U-shaped having an open side sealed with a closure plate, the closure plate defining a connection opening creating a fluid connection to the inside of the filter element.

2. The air filter element according to claim 1, wherein the first and second end plates each project onto the intermediate plate completely perpendicularly to the intermediate plate.

3. The air filter element according to claim 2, wherein the first and second plates form at least one projection at the intermediate plate and an overlap region is formed at an area of the projection and defines at least one opening, wherein the overlap region is smaller than the projection of at least one of the end plates.

4. The air filter element according to claim 1, wherein the first and second end plates are one of geometrically different and identical.

5. The air filter element according to claim 1, wherein the first and second filter bodies are one of identical and different.

6. The air filter element according to claim 1, wherein
the first end plate closes the first filter body in an airtight manner on a first axial side,
the intermediate plate closes the first filter body on a second axial side and the second filter body on a first axial side in an airtight manner,
the second end plate closes the second filter body in an airtight manner on a second axial side.

7. The air filter element according to claim 1, wherein the closure plate extends substantially parallel to an axial direction at least in a region of the first filter body.

8. The air filter element according to claim 1, wherein the closure plate extends axially over at least one of the first and second filter bodies.

9. The air filter element according to claim 1, wherein the second filter body is U-shaped having an open side sealed with a closure plate.

10. The air filter element according to claim 1, wherein the second filter body encloses a second interior in a circumferential direction.

11. The air filter element according to claim 1, wherein the first and second filter bodies are different in at least one of geometrically and in terms of their filtration effect.

12. The air filter element according to claim 1, wherein the end plates and the intermediate plate run parallel to each other.

13. An air filter, comprising:
a filter housing defining an air inlet and an air outlet and enclosing a receiving space,
a filter element configured to be inserted into the receiving space and separate an untreated side, the untreated side being fluidly-connected to the air inlet from a clean side which is fluidly-connected to the air outlet;
wherein the filter element includes a first end plate and a second end plate spaced apart from each other in an axial direction, a first filter body and a second filter body arranged between the first and second end plates, and an intermediate plate arranged axially between the first and second filter bodies;
wherein the first and second end plates are closed and the intermediate plate defines at least one intermediate opening extending through a first interior bounded by the first filter body to a second interior bounded by the second filter body;
wherein the first filter body is U-shaped having an open side sealed with a closure plate, the closure plate defining a connection opening creating a fluid connection to the inside of the filter element; and
wherein the second filter body is U-shaped having an open side sealed with a closure plate.

14. The air filter of claim 13, further comprising:
a first end plate and a second end plate spaced apart from each other in an axial direction and configured to bound the filter element in the axial direction,
a first filter body is arranged axially between the first and second end plates,
a second filter body arranged axially between the first and second end plates, and
an intermediate plate arranged axially between the first and second filter bodies,
wherein the intermediate plate has an intermediate plate area greater than at least one of a first end plate area of the first end plate and a second end plate area of the second end plate.

15. An air filter element for an air filter, comprising:
a first filter body comprising a filter material,
a first end plate and a second end plate spaced apart from each other in an axial direction and configured to bound the filter element in the axial direction, wherein the first filter body is arranged axially between the first and second end plates,
a second filter body arranged axially between the first and second end plates, and
an intermediate plate arranged axially between the first and second filter bodies, wherein the intermediate plate has an intermediate plate area, and the first end plate has a first end plate area;
wherein the first and second end plates are closed and the intermediate plate defines at least one intermediate opening extending through a first interior bounded by the first filter body to a second interior bounded by the second filter body;
wherein the first filter body and the second filter body are arranged offset with respect to one another; wherein the first filter body is U-shaped having an open side sealed with a closure plate, the closure plate defining a connection opening creating a fluid connection to the inside of the filter element.

16. The air filter element of claim 15, wherein the intermediate plate area is greater than the first end plate area.

17. The air filter element of claim 15, wherein the first end plate area is greater than a second end plate area of the second end plate.

18. The air filter element of claim 15, further comprising:
a filter housing defining an air inlet and an air outlet and enclosing a receiving space, wherein the filter element is configured to be inserted into the receiving space and separate an untreated side, the untreated side being fluidly-connected to the air inlet from a clean side which is fluid-connected to the air outlet.

19. The air filter element according to claim 1, wherein the first filter body and the second filter body are arranged offset with respect to one another.

* * * * *